United States Patent
Lee

(10) Patent No.: US 7,363,016 B2
(45) Date of Patent: Apr. 22, 2008

(54) DIVERSITY RECEIVING APPARATUS AND METHOD

(75) Inventor: One-Pil Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 758 days.

(21) Appl. No.: 10/397,616

(22) Filed: Mar. 26, 2003

(65) Prior Publication Data

US 2003/0186660 A1    Oct. 2, 2003

(30) Foreign Application Priority Data

Mar. 27, 2002    (KR) .................. 10-2002-0016803

(51) Int. Cl.
 *H04B 1/06* (2006.01)
(52) U.S. Cl. .................. 455/276.1; 455/137; 455/140; 455/277.1
(58) Field of Classification Search ................ 455/132, 455/133, 137, 139, 269, 272, 273, 276.1, 455/277.1, 277.2, 278.1, 280, 296, 303, 304, 455/500, 501, 506, 140
See application file for complete search history.

(56) References Cited

U.S. PATENT DOCUMENTS

| | | | | |
|---|---|---|---|---|
| 4,079,318 A | * | 3/1978 | Kinoshita | .................... 455/139 |
| 4,097,804 A | * | 6/1978 | Yamaguchi et al. | ......... 455/132 |
| 4,326,294 A | * | 4/1982 | Okamoto et al. | ........... 455/139 |
| 4,386,435 A | * | 5/1983 | Ulmer et al. | ................ 455/139 |
| 5,203,023 A | * | 4/1993 | Saito et al. | .................. 455/133 |
| 5,280,637 A |   | 1/1994 | Larosa et al. | ................ 455/134 |
| 5,345,603 A | * | 9/1994 | Laffont | ........................ 455/139 |
| 6,546,236 B1 | * | 4/2003 | Canada et al. | .............. 455/304 |

FOREIGN PATENT DOCUMENTS

| | | |
|---|---|---|
| CN | 1065694 C | 5/2001 |
| EP | 0546806 A1 | 6/1993 |
| JP | 53-077410 | 7/1978 |
| JP | 61-069227 | 4/1986 |
| JP | 04-222124 | 8/1992 |
| JP | 06-303171 | 10/1994 |
| JP | 08-274695 | 10/1996 |

* cited by examiner

*Primary Examiner*—Quochien B. Vuong
(74) *Attorney, Agent, or Firm*—Lee, Hong, Degerman, Kang & Schmadeka

(57) ABSTRACT

A communication system comprises a first signal adjusting unit for amplifying a first signal received by a first antenna; a second signal adjusting unit for amplifying and phase-shifting a second signal received by a second antenna to generate a phase-shifted signal; first and second mixers for respectively mixing signals generated by said first and second signal adjusting units to generate respective first and second intermediate frequency signals; a signal combiner for generating an output signal provided to a demodulator, the output signal comprising at least one of the first intermediate frequency signal and/or the second intermediate frequency signal; and a phase detector for extracting phase information from the signals generated by the first and second signal adjusting units.

36 Claims, 5 Drawing Sheets

DIVERSITY RECEIVING APPARATUS AND METHOD

CROSS REFERENCE TO RELATED APPLICATION

Pursuant to 35 U.S.C. § 119(a), this application claims the benefit of earlier filing date and right of priority to the Korean Patent Application No. 2002-16803, filed on Mar. 27, 2002, entitled "Diversity Receiver Using Automatic Control Phase Compensation," the content of which is hereby incorporated by reference in its entirety.

BACKGROUND OF THE INVENTION

1. Field of the Invention

The present invention relates to a receiver of a radio communication system and, more particularly, to a diversity receiving apparatus and method.

2. Description of the Related Art

A diversity technique is used to improve the quality of a received signal in a digital radio communication system. In general, a diversity system includes two or more antennas to select or switch a good quality signal or to combine received signals, so that a better quality signal is obtained.

Diversity receiving methods include a switching method, an in-phase combining or equal-gain combining method, and a maximal ratio combining method.

Selection diversity refers to selectively receiving the most powerful signal among signals received by a plurality of antennas. Thus, if some signals received by the plurality of antennas are degraded below a reception sensitivity, the best signals are selected so that a reception signal quality above a certain level can be constantly obtained.

In order to use selection diversity, a controller of a receiving party should recognize the strength of a signal received by the antenna in real time. If this is difficult, a switching diversity method can be used instead. That is, if strength of a reception signal is degraded below a threshold value while the signal is being received by a first antenna, then reception is switched to a second or a third antenna. Switching diversity ensures the improvement of the quality of a reception signal in proportion to that of the selection diversity.

Though selection diversity and switching diversity (referred to as "level comparing diversity", hereinafter) are expected to improve signal quality in a fading environment where strength of the reception signal changes in time, in a static environment where strength of the reception signal does not change, the above method do not provide for much improvement.

The in-phase combining diversity is a method in which a phase of a signal received by each antenna is controlled and combined, and the combined signal is used as a final reception signal. Since the method uses combining of signals, rather than simply selecting a signal, a remarkable improvement of a signal quality can be obtained compared to the level comparing diversity. The in-phase combining technique requires a phase shifter for adjusting a phase of a signal and obtains an improvement in a reception signal quality even in the static environment as well as in the fading environment.

FIG. 1 illustrates the construction of a diversity receiving apparatus (Korean Patent Laid Open Publication No. 1996-0016194 entitled 'diversity receiving apparatus using phase compensation'), which adopts an in-phase combining diversity method.

As shown in FIG. 1, the conventional diversity receiver includes: a phase shifter 10 for shifting the phase of a signal (first signal) received through a first antenna 6 to one of 0°, 90°, 180° and 270°; a signal combiner 20 for combining the phase-shifted first signal and a signal (second signal) received through a second antenna 8; a tuner 30 for selecting a signal from output signals of the signal combiner 20 and improving the signal-to-noise ratio; an amplifier 40 for amplifying the output signal of the tuner 40; a mixer 50 for mixing a signal outputted from the amplifier 40 and a signal of a local oscillator and outputting an intermediate frequency (IF) signal; an intermediate frequency amplifier 60 for amplifying a signal with a certain frequency band from the intermediate frequency signal; a received signal strength indicator(RSSI) 70 for detecting a strength of the signal outputted from the intermediate frequency amplifier 60; and a controller for comparing the detected strength of the signal and a reference value and controlling the phase shifter 10.

The signal (first signal) received through the first antenna 6 is phase-shifted by 0°, 90°, 180° and 270° while passing through the phase shifter 10 and then transmitted to the signal combiner 20. Then, the signal combiner 20 in-phase combines the phase-shifted first signal and the signal (second signal) received through the second antenna 8. The combined signal is transmitted to the mixer 50 through the tuner 30 and the amplifier 40, and converted into an intermediate frequency signal in the mixer 50. The intermediate frequency signal of the mixer 50 is transmitted to a demodulator after passing through the intermediate frequency amplifier 60.

The received signal strength indicator 70 detects the strength of the signal outputted from the intermediate frequency amplifier 60, and the controller 80 compares the detected strength of the signal with a reference value and shifts a phase of the phase shifter 10 so that the detected strength of the signal can become the greatest.

When a phase difference between the first signal and the second signal is not exactly 0°, 90°, 180° or 270°, combination of the two signals (first and second signals) causes a combination loss. In addition, due to a time delay, such as a multi-pass fading or a phase delay, the combined signal may have rather less strength. For example, in a case that a phase difference between the first and the second signals is 180°, combination of first and second signals may result in cancellation of the combined output signal.

Using the in-phase combing (or equal gain combing) method, the conventional diversity receiver may have a problem with much power difference between the received two signals. If one of two combined signals (S1 and S2) has a very small power and the two signals have a similar amount of noise components, if the two signals (S1 and S2) are combined, the combined signal obtains some gain but the noise component of the combined signal is doubled, resulting in degradation of the signal-to-noise ratio of the combined signal. For this case, a level comparing diversity method is favored in which a signal with high power from two reception signals is selected.

FIG. 2 is a graph of a signal affected by a Rayleigh fading. As shown in FIG. 2, the Rayleigh fading occurs in an actual radio environment, and since the radio environment changes rapidly, a signal should be compensated quickly. However, in the conventional art, the position where a signal becomes the strongest is searched by shifting the phase of signal, for which four times of phase shifting at the maximum is performed with 0°, 90°, 180° and 270° to measure the strength signal. With much time taken for compensating the phase, the conventional art encounters many problems in the actual radio environment. Thus, methods and systems are needed to overcome the mentioned problems.

SUMMARY OF THE INVENTION

A communication system in accordance with one or more embodiments of the invention comprises a first signal adjusting unit for amplifying a first signal received by a first antenna; a second signal adjusting unit for amplifying and phase-shifting a second signal received by a second antenna to generate a phase-shifted signal; first and second mixers for respectively mixing signals generated by said first and second signal adjusting units to generate respective first and second intermediate frequency signals; a signal combiner for generating an output signal provided to a demodulator, the output signal comprising at least one of the first intermediate frequency signal and/or the second intermediate frequency signal; and a phase detector for extracting phase information from the signals generated by the first and second signal adjusting units.

The communication system may further comprise a controller for controlling the signal combiner based on the extracted phase information and preferably a received signal strength indicator for detecting power of the output signal generated by the signal combiner.

The controller detects a phase shift (na) based on the extracted phase information and wherein the controller controls the second signal adjusting unit to perform a phase shifting in accordance with the detected phase shift (na). The controller also controls the signal combiner according to a power difference between the phase shifted signal and the first signal.

In some embodiments, the controller receives a first phase information associated with the first signal, a second phase information associated with the second signal, and a third phase information associated with the phase-shifted signal. The controller then detects a first power difference between the first signal and the second signal, and a second power difference between the first signal and the phase-shifted signal based on the first, second, and third phase information. The controller determines a change rate between the first and second power differences and a third power difference between the first signal and the phase-shifted signal based on the change rate.

In certain embodiments, the controller generates a phase-shift signal forwarded to the signal combiner so that the signal combiner generates the output signal provided to the demodulator based on the third power difference between the first signal and the phase-shifted signal. The second signal can be phase-shifted by a certain angle (na). The controller can determine a third power difference between the first signal and the phase-shifted signal based on the change rate; and the controller determines a phase shift so that the signal combiner with reference to the third power difference can produce the strongest output signal.

If the third power difference between the phase-shifted signal and the first signal is larger than a first value, then the controller controls the signal combiner to select a stronger signal from in between the phase-shifted signal and the first signal as the output signal. If the power difference between the phase-shifted signal and the first signal is smaller than the first value, the controller controls the signal combiner to in-phase combine the phase-shifted signal and the first signal.

The first signal adjusting unit comprises a duplexer for connecting a transmitter and a receiver to the first antenna for receiving the first signal. Further, the first signal adjusting unit may comprise a first amplifier for amplifying the first signal. The second signal adjusting unit comprises a filter for filtering the second signal at a first bandwidth and a second amplifier for amplifying the second signal. Further, the second signal adjusting unit comprises a phase shifter for shifting phase of the second signal.

In accordance with one or more embodiments of the invention a method of receiving a communication signal in a communication system having two or more antennas comprises amplifying a first signal received by a first antenna; amplifying a second signal received by a second antenna; phase-shifting the amplified second signal; converting the first and second amplified and phase-shifted signals to intermediate frequency (IF) signals; generating an output signal comprising of at least one of the first IF signal and/or the second IF signal; detecting phase information of the first and second amplified and phase-shifted signals; and controlling the generation of the output signal based on the phase information. The output signal is fed to a demodulator.

In one embodiment, the second signal is filtered to select a first bandwidth of the second signal for amplification. The output signal may comprise a combination of the first IF signal with the second IF signal. Alternatively, the output signal may be generated from either the first IF signal, if the first IF signal is stronger than the second IF signal or the second IF signal if the second IF signal is stronger than the first IF signal.

In some embodiments based on the phase information a power difference between the first and second IF signals is determined. The first IF signal and the second IF signal are combined, if the power difference is below a threshold value and one of the first IF signal or the second IF signal is selected, if the power difference is above a threshold value. Preferably, the first IF signal is selected, if the first signal is greater than the second IF signal and the second IF signal is selected, if the second IF signal is greater than the first IF signal.

In accordance with another embodiment of the invention, a signal receiving apparatus comprises a first signal receiving means; a second signal receiving means; a first signal adjusting means for amplifying a first signal received by the first receiving means; a second signal adjusting means for amplifying and phase-shifting a second signal received by the second receiving means; first and second signal mixing means for mixing first and second amplified and phase-shifted signals to respectively generate first and second intermediate frequency IF signals; and a phase detecting means for determining phase difference information by processing signals generated by the first and second signal adjusting means.

The apparatus may further comprise a signal combining means for generating an output signal comprising of at least one of the first IF signal and the second IF signal based on the phase difference information, and a controller means for providing a control signal to the signal combining means to control the content of the output signal based on the phase difference information. A received signal strength indicating means may also be included for detecting power of the output signal.

The first signal adjusting means comprises a duplexer for connecting a transmitter and a receiver to the first signal receiving means; and a first amplifying means for amplifying a signal generated by the duplexer. The second signal adjusting means comprises a filtering means for selectively filtering a bandwidth of the second signal; a second amplifying means for amplifying the filtered second signal; and a phase shifting means for shifting a phase of the filtered second signal.

In one embodiment, the first and second signal receiving means are physically isolated to have a different gain and the first and second signal adjusting means comprise low noise amplifiers. In a certain embodiment, the first and second intermediate frequency signals are combined to produce the output signal, if the phase difference information meets a first threshold. Alternatively, if the phase difference information meets a second threshold, then the first IF signal is selected as the output signal, if the first IF signal is stronger than the second IF signal, and the second IF signal is selected as the output signal, if the second IF signal is stronger than the first IF signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
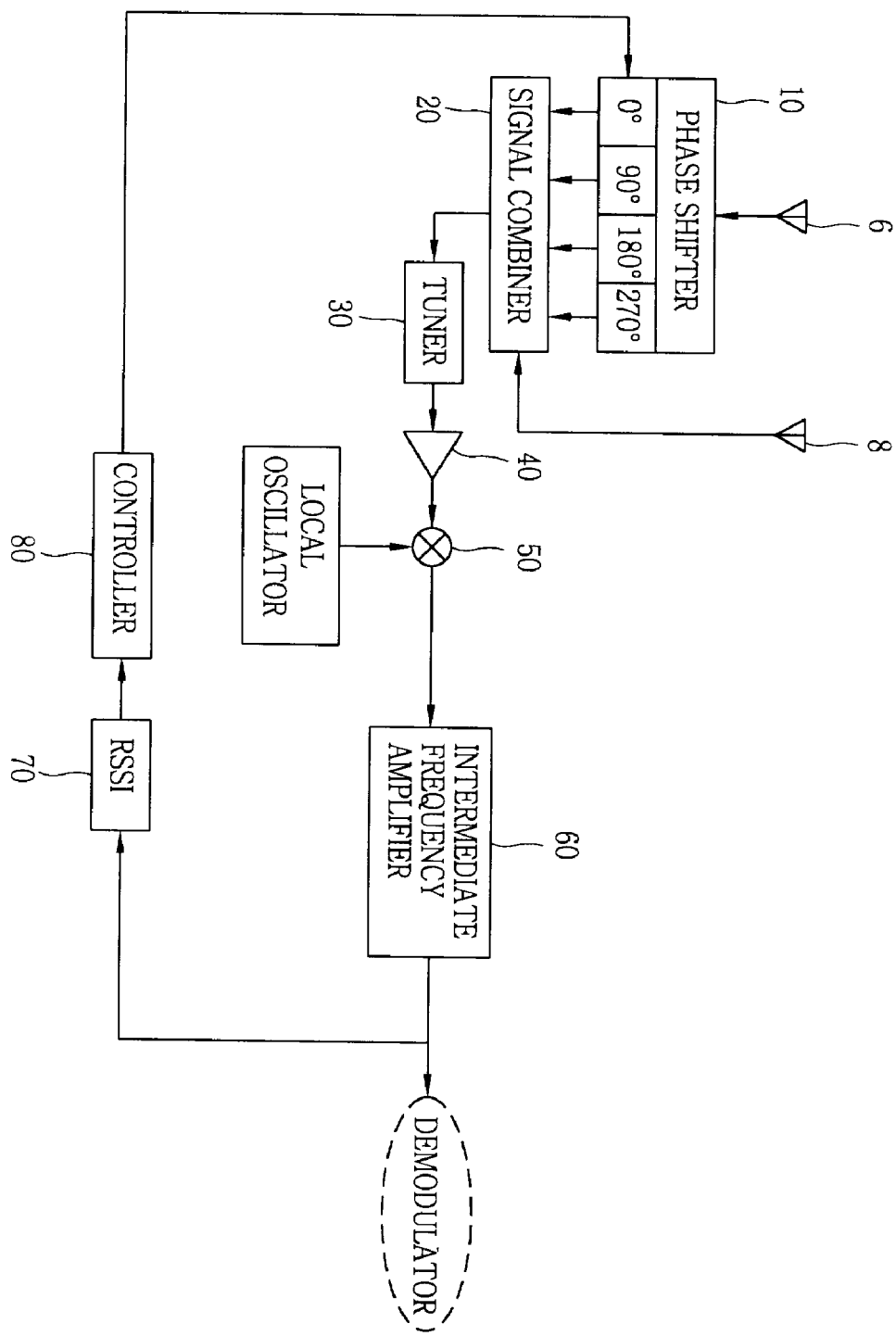
FIG. 1 illustrates the construction of a diversity receiving apparatus in accordance with a related art system.
Figure 2:
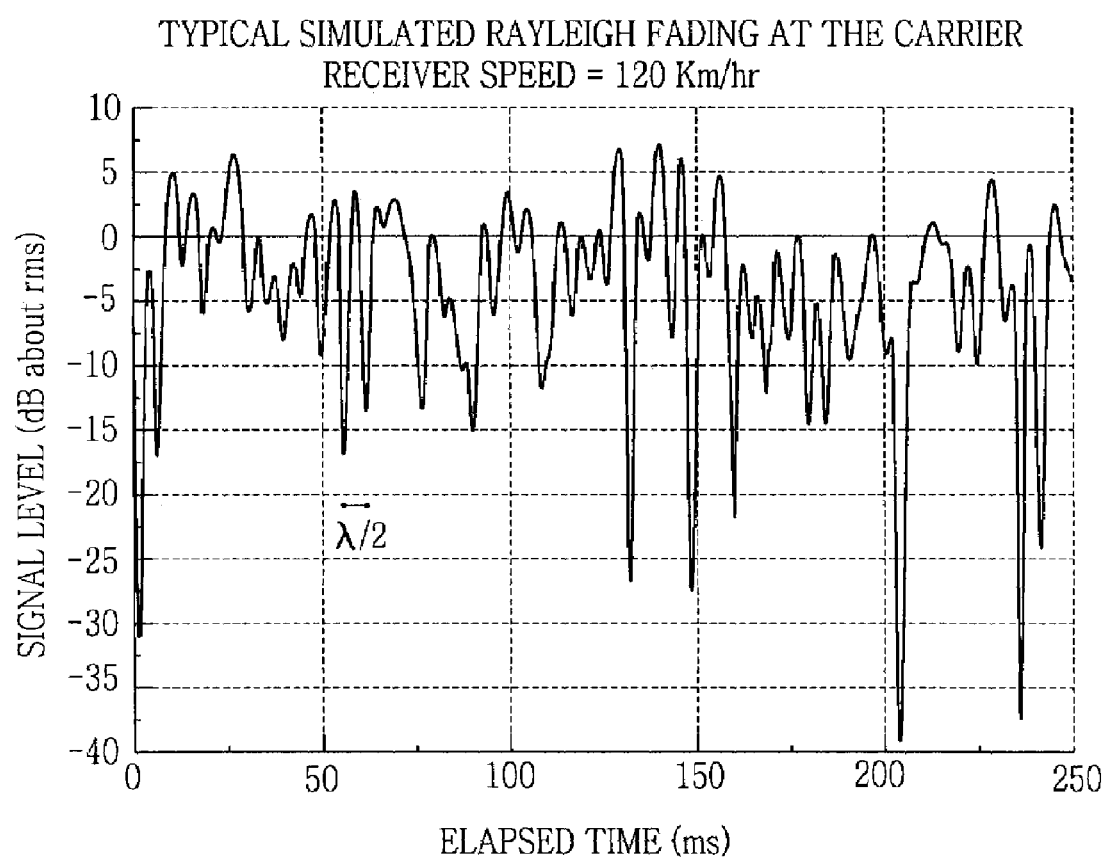
FIG. 2 is a graph of a signal affected by a Rayleigh fading.
Figure 3:
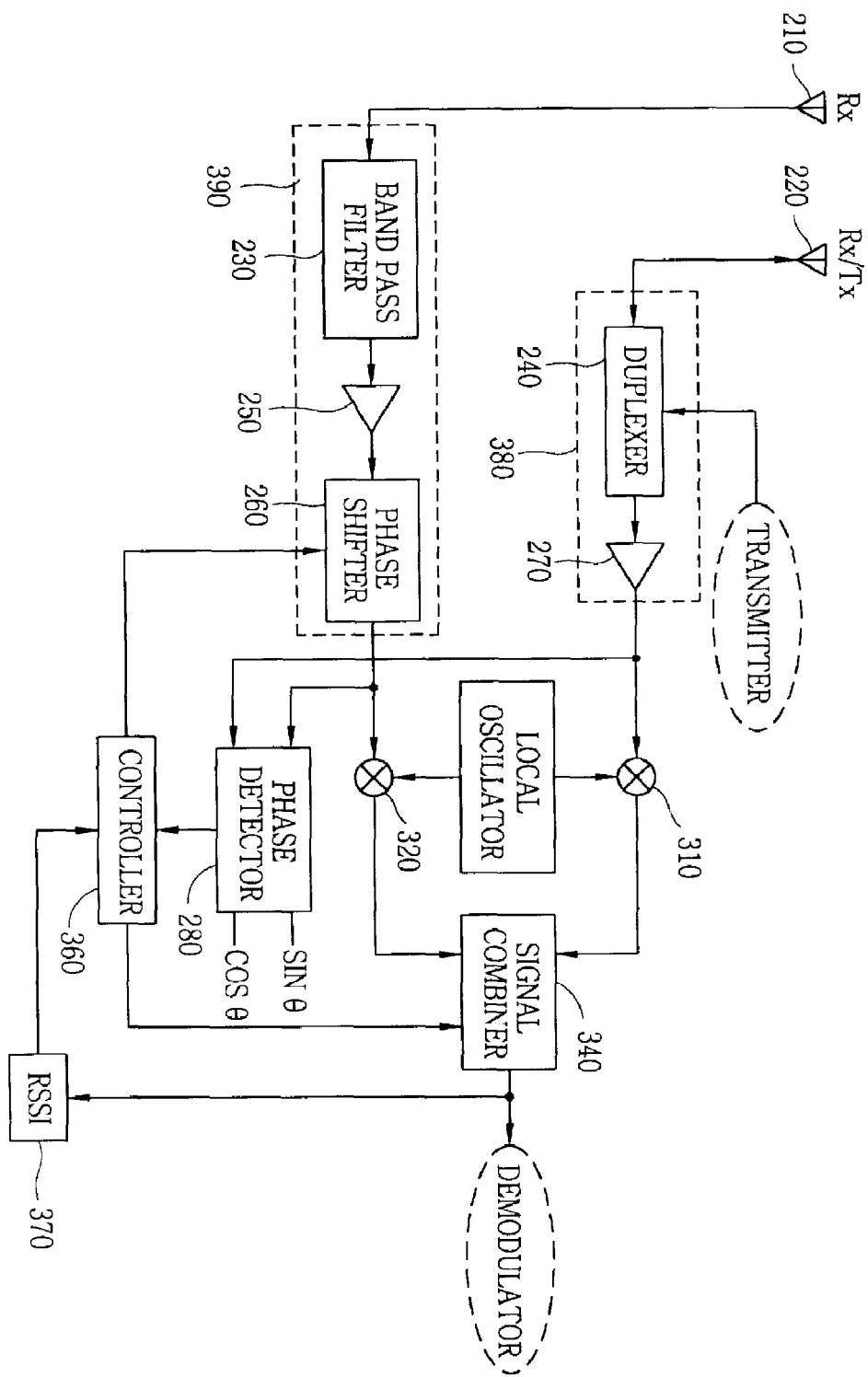
FIG. 3 is a block diagram illustrating an exemplary embodiment of a diversity receiving apparatus, in accordance with the invention.

Referring to FIG. 3, a diversity receiving apparatus in accordance with one embodiment of the present invention comprises a diversity antenna 210 having at least a signal reception function; a main antenna 220 having a signal transmission and/or reception function; a first signal adjusting unit 380 for amplifying the first signal received by the main antenna 220; a second signal adjusting unit 390 for amplifying the second signal received by the diversity antenna 210 and phase-shifting it; and first and second mixers 310 and 320 each mixing output signals of first and second signal adjusting units 380 and 390 into an intermediate frequency.

Certain embodiments further comprise a signal combiner 340 for combining signals outputted from the first and second mixers 310 and 320 or selecting one of the signals outputted from first and second mixers 310 and 320, and outputting it to a demodulator; a phase detector 280 for extracting phase information of the signal outputted from first and second signal adjusting units 380 and 390; and a controller 360 for controlling the signal combiner 340 based on the extracted phase information.

The diversity receiving apparatus of the present invention further comprises a received signal strength indicator 370 for detecting power of the signal outputted from the signal combiner 340. The first signal adjusting unit 380 comprises a duplexer 240 for connecting a transmitter and a receiver to the main antenna; and a first amplifier 270 for amplifying a first signal outputted from the duplexer The second signal adjusting unit 390 comprises a filter 230 for extracting a signal of a specific band width from the received signal by the diversity antenna 210; a second amplifier 250 for amplifying an output signal of the filter; and a phase shifter 260 for shifting a phase of a signal outputted from the second amplifier at certain angle intervals.

In some embodiments, the main antenna 220 and the diversity antenna 210 are preferably disposed to be physically isolated so that they have a different antenna gain but the same reception pattern. The first and second amplifiers 250 and 270 are preferably low noise amplifiers. The duplexer 240 connects a transmitter and a receiver to the main antenna 220, for example.

The first signal received by the main antenna 220 and the second signal received by the diversity antenna 210 are preferably transmitted to the signal combiner 340 through separate paths. That is, the first signal is transmitted to the signal combiner 340 through the duplexer 240 and the first amplifier 270, while the second signal is transmitted to the signal combiner 340 through the band pass filter 230, the second amplifier 250 and the phase shifter 260, in accordance with one embodiment.

Preferably, a signal outputted from the signal combiner 340 is transmitted to a demodulator. The phase detector 280 extracts phase information of the first and second signals from the respective output signals of the first amplifier 270 and the phase shifter 260.

In one embodiment of the present invention, a quadrature mixer can be adopted as the phase detector 280. An output of the quadrature mixer can be expressed as a cos θ and a sin θ, which are confirmed through a polar graph illustrated in FIG. 4. θ indicates a phase shift between the first signal and the second signal.

The cos θ and sin θ signals outputted from the phase detector 280 are transmitted to the controller 360 and a certain memory through an analog/digital converter (not shown). The controller 360 detects a phase difference (θ) between the two signals (S1 and S2) received by the antennas 210 and 220 based on the values of cos θ and sin θ. The controller 360 obtains power of each of the two signals S1 and S2 and a power difference between the two signals.

Assume that a signal obtained by shifting the second signal by approximately 90° is a third signal, a signal obtained by shifting the second signal by approximately 180° is a fourth signal, and a signal obtained by shifting the second by approximately 270° is a fifth signal. The controller 360 obtains the power difference between the first signal and the second signal and the power difference between the first signal and the third signal, and then obtains a change rate between the two power difference.

In certain embodiments, by using the change rate, a power difference between the first signal and the fourth signal can be inferred, and a power difference between the first signal and the fifth signal can also be inferred.

With reference to the above power differences, a phase shift (nα, n=0, 1, 2, 3, . . . α=90°) at which the strongest signal can be obtained is obtained, and then it is determined whether to use the level comparing diversity method or the in-phase combining diversity method depending on a power difference between the phase-shifted (nα) signal and the first signal.

In one embodiment, the diversity receiving apparatus of the present invention employs the in-phase combining diversity method and/or the level comparing diversity method to benefit from both methods. For example, if the two signals (S1 and S2) received through the antennas 210 and 220 have a similar strength, the in-phase combining diversity method is adopted. If there is a big difference between the strength of the two signals (S1 and S2), the level comparing diversity method is adopted.

The diversity receiving apparatus of the present invention will now be described in detail. Assumed that detected phase information, that is, output signals (cos $\theta_1$, sin $\theta_1$) of the phase detector 280 are 'a' and 'b', signals (Cos $\theta_2$, sin $\theta_2$) outputted from the phase detector 280 after the phase is shifted (by for example 90°) by the phase shifter 260 are 'c' and 'd', and a ratio of strength between the two output signals (ab & cd) is 'R'. Then, the following relational expression is obtained:

$$R_1 = a^2 + \left(\frac{b}{R}\right)^2 \quad R_2 = c^2 + \left(\frac{d}{R}\right)^2,$$

$$\cos\theta_1 = \frac{a}{\sqrt{R_1}} \quad \sin\theta_1 = \frac{b/R}{\sqrt{R_1}} \quad \cos\theta_2 = \frac{c}{\sqrt{R_2}} \quad \sin\theta_2 = \frac{d/R}{\sqrt{R_2}}$$

Since $\theta_1+\theta_2=90°$, when the above expressions are substituted to cos $\theta_1$=–sin $\theta_2$ sin $\theta_1$= cos $\theta_2$, $$\frac{R \times a}{d} = -\frac{b}{c \times R},$$

then we have $$'R' = \sqrt{-\frac{b \times d}{c \times a}}.$$

Figure 4:
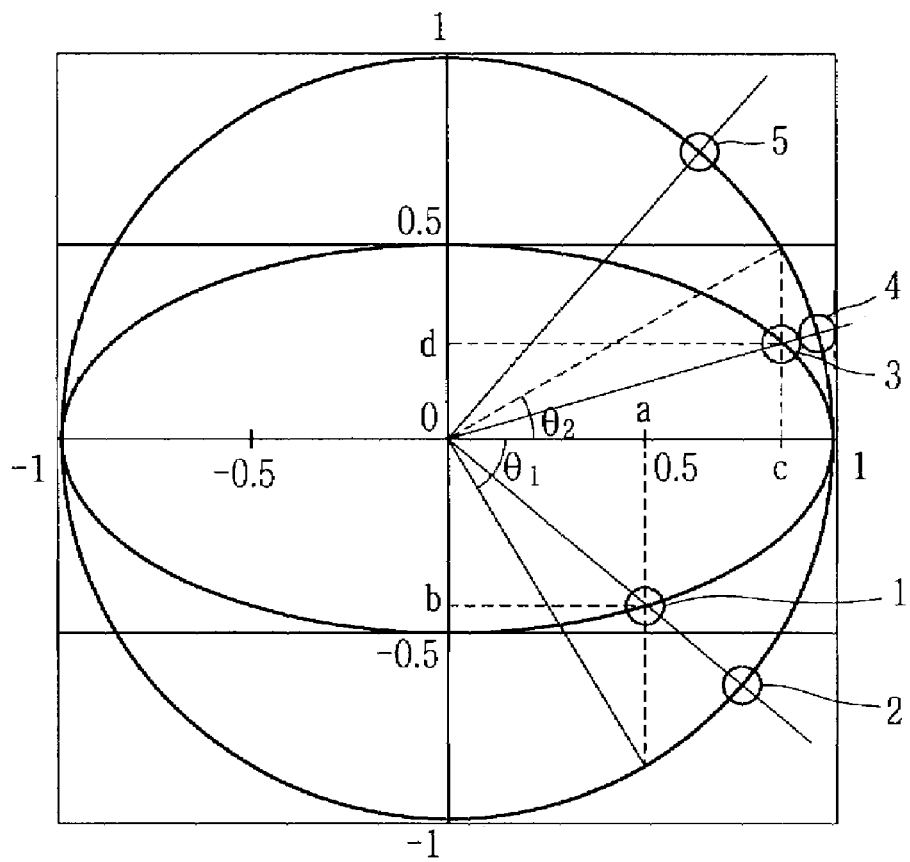
FIG. 4 is a polar graph of two signals (S1 and S2) when R=0.5, for example.

FIG. 4 is a polar graph showing two signals (S1 and S2) when R=0.5, for example. As shown in FIG. 4, values of output signals (cos $\theta_1$, sin $\theta_1$) 'a' and 'b' of the phase detector 280 are respectively 0.5 and −0.43, for example. Through calculation, it can be obtained that $\theta_1$ is −60°, for example. When 'R' is approximated to '1', $\theta_1$, is −40.890°.

Values of the output signals (cos $\theta_2$, $_{sin\ \theta2}$) of the phase detector 280 are respectively 0.86 and 0.25, for example. Through calculation, it can be obtained that $\theta_2$ is 30°. When 'R' is approximated to '1', $\theta_2$ is 16.1°. These expressions are exemplary and can be verified with substituting the above values. Other values may be used in other embodiments. As such, the scope of the invention is not to be construed as limited to the exemplary embodiments and values disclosed here.

Figure 5:
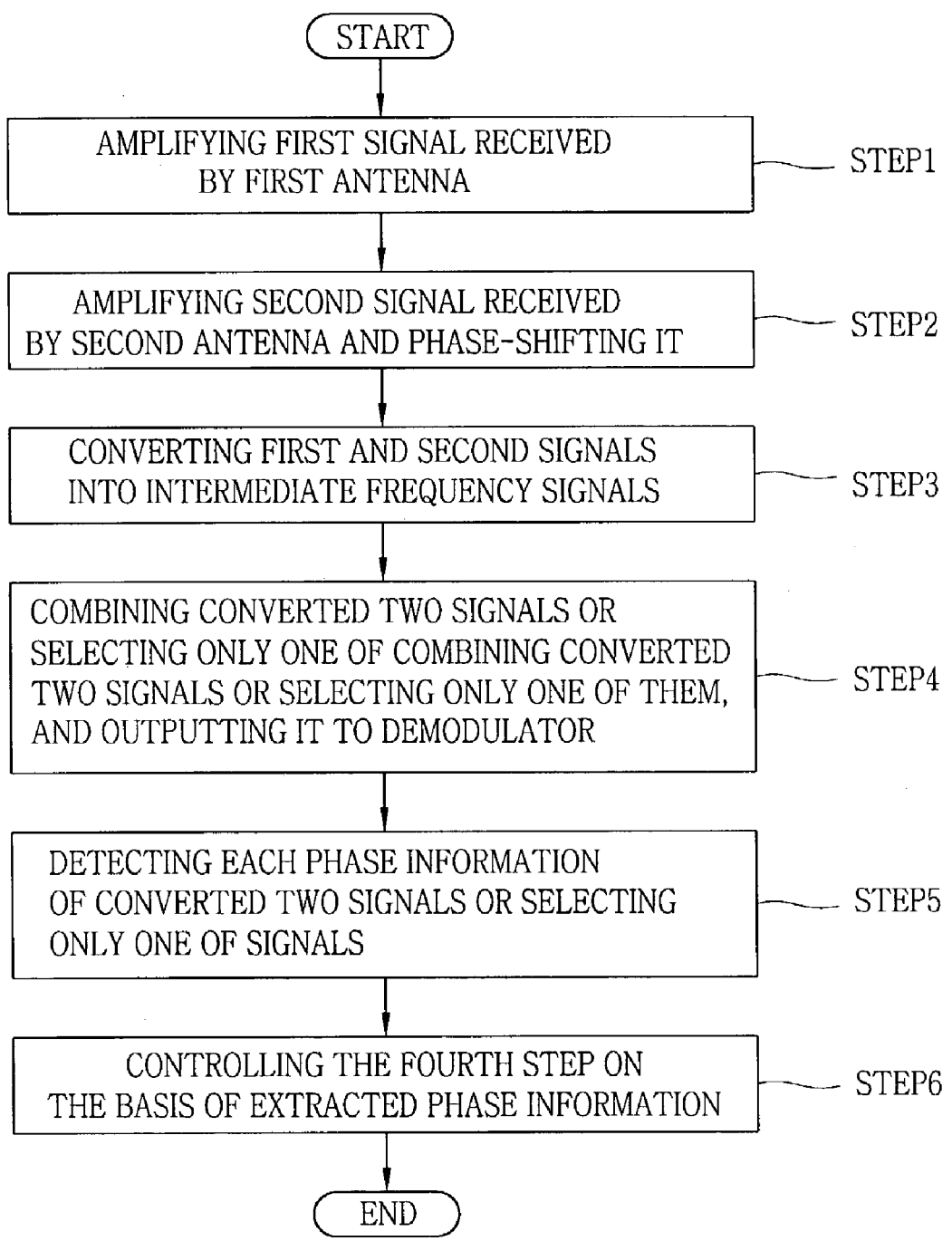
FIG. 5 is a flow chart of a diversity receiving method in accordance with one embodiment of the present invention.

FIG. 5 is a flow chart of a diversity receiving method in accordance with the present invention. As shown in FIG. 5, a diversity receiving method in accordance with one embodiment comprises amplifying a first signal received by the first antenna 220 (S1); amplifying a second signal received by a second antenna 210 and phase-shifting it (S2); respectively converting the processed first and second signals to intermediate signals (S3); combining the converted two signals or selecting one out of the two converted signals and outputting it to a demodulator (S4); detecting phase information of the converted two signals (S5); and controlling the step S4 on the basis of the extracted phase information (S6).

In one embodiment, first and second signals (S1 and S2) received through the first antenna 220 and the second antenna 210 are transmitted to the signal combiner 340 via separate paths. That is, the first signal (S1) is transmitted to the signal combiner 340 through the duplexer 240 and the first amplifier 270, while the second signal (S2) is transmitted to the signal combiner 340 through the band pass filter 230, the second amplifier 250 and the phase shifter 260. The phase detector 280 detects phase information (cos $\theta_1$, sin $\theta_1$) of the first and second signals inputted to the signal combiner 340, and transmits it to the controller 360.

Then, the controller 360 obtains a phase difference ($\theta_1$) and power of the two signals (S1 and S2) on the basis of the phase information (cos $\theta_1$, sin $\theta_1$). In addition, the controller 360 obtains a phase difference ($\theta$2) between two signals (S1, S2+90°) and their power on the basis of phase information (cos $\theta_2$, sin $\theta_2$) of the first signal (S1). The phase difference between the third signal (S2+90°) which has been obtained by shifting the phase of the second signal by 90°, and the power difference between the two signals (S1, S2+90°) are also obtained.

The controller 360 obtains a change rate (R) of the power difference between the two signals, in one or more embodiments. By using the change rate (R), a power difference between the first signal (S1) and a fourth signal (S2+180°) and a power difference between the first signal (S1) and a fifth signal (S2+270°) are inferred. Then, with reference to the results, a phase shift (S2+nα, n=0,1,2,3, . . . α=90°) where the strongest signal is provided is obtained in signal combining, and the phase shifter 260 is controlled to perform the phase shift (nα).

If the power difference between the phase-shifted (S2+nα) signal and the first signal (S1) is greater than a threshold value, the diversity receiving apparatus of the present invention uses the level comparing diversity method. That is, the controller 360 controls the signal combiner 340 to select a signal with a stronger power from the two signals (S1 and S2+nα). At this time, the signal combiner 340 is operated as a selector.

Meanwhile, if the power difference between the phase-shifted (S2+nα) signal and the first signal (S1) is smaller than the threshold value, the controller controls the signal combiner 340 to in-phase combine the two signals (S1 and S2+nα).

As such, the diversity receiving apparatus of the present invention has the following advantages. It is implemented to quickly perform a phase compensation, so that it is suitable for an actual radio environment in which a signal phase changes fast. If the power difference between two reception signals is small, the in-phase combining method is adopted. If the power difference between two reception signals is large, the level comparing diversity method is adopted. Accordingly, the diversity receiving apparatus takes advantage of at least one of the above two methods. In addition, since the phase shifter is positioned at the next stage of the low noise amplifier, if a signal loss occurs in the phase shifter, it does not substantially affect the overall noise exponent of the receiver.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A communication system comprising:
    a first signal adjusting unit for amplifying a first signal received by a first antenna;
    a second signal adjusting unit for amplifying and phase-shifting a second signal received by a second antenna to generate a phase-shifted signal;
    first and second mixers for respectively mixing signals generated by said first and second signal adjusting units to generate respective first and second intermediate frequency signals;
    a signal combiner for generating an output signal provided to a demodulator, the output signal comprising at least one of the first intermediate frequency signal and/or the second intermediate frequency signal;
    a phase detector for extracting phase information from the signals generated by the first and second signal adjusting units; and
    a controller for controlling the signal combiner based on the extracted phase information, wherein the controller receives a first phase information associated with the first signal, a second phase information associated with the second signal, and a third phase information associated with the phase-shifted signal.

2. The communication system of claim 1 further comprising a received signal strength indicator for detecting power of the output signal generated by the signal combiner.

3. The communication system of claim 1, wherein the controller detects a phase shift (na) based on the extracted phase information and wherein the controller controls the second signal adjusting unit to perform a phase shifting in accordance with the detected phase shift (na).

4. The communication system of claim 1, wherein the controller detects a phase shift (na) based on the extracted phase information and wherein the controller controls the signal combiner according to a power difference between the phase shifted signal and the first signal.

5. The communication system of claim 1, wherein the controller detects a first power difference between the first signal and the second signal, and a second power difference between the first signal and the phase-shifted signal based on the first, second, and third phase information.

6. The communication system of claim 5, wherein the controller determines a change rate between the first and second power differences.

7. The communication system of claim 6, wherein the controller determines a third power difference between the first signal and the phase-shifted signal based on the change rate.

8. The communication system of claim 7, wherein the controller generates a phase-shift signal forwarded to the signal combiner so that the signal combiner generates the output signal provided to the demodulator based on the third power difference between the first signal and the phase-shifted signal.

9. The communication system of claim 6, wherein the second signal is shifted by a certain angle (na).

10. The communication system of claim 9, wherein the controller determines a third power difference between the first signal and the phase-shifted signal based on the change rate; and the controller determines a phase shift so that the signal combiner with reference to the third power difference can produce the strongest output signal.

11. The communication system of claim 10, wherein if the third power difference between the phase-shifted signal and the first signal is larger than a first value, then the controller controls the signal combiner to select a stronger signal from in between the phase-shifted signal and the first signal as the output signal.

12. The communication system of claim 11, wherein if the power difference between the phase-shifted signal and the first signal is smaller than the first value, the controller controls the signal combiner to in-phase combine the phase-shifted signal and the first signal.

13. The communication system of claim 1, wherein the first signal adjusting unit comprises a duplexer for connecting a transmitter and a receiver to the first antenna for receiving the first signal.

14. The communication system of claim 1, wherein the first signal adjusting unit further comprises a first amplifier for amplifying the first signal.

15. The communication system of claim 1, wherein the second signal adjusting unit comprises a filter for filtering the second signal at a first bandwidth.

16. The communication system of claim 1, wherein the second signal adjusting unit comprises a second amplifier for amplifying the second signal.

17. The communication system of claim 1, wherein the second signal adjusting unit comprises a phase shifter for shifting phase of the second signal.

18. A method of receiving a communication signal in a communication system having two or more antennas, the method comprising:
    amplifying a first signal received by a first antenna;
    amplifying a second signal received by a second antenna;
    phase-shifting the amplified second signal;
    converting the first and second amplified and phase-shifted signals to intermediate frequency (IF) signals;
    generating an output signal comprising of at least one of the first IF signal and/or the second IF signal;
    detecting phase information of the first and second amplified and phase-shifted signals;
    receiving a first phase information associated with the first signal, a second phase information associated with the second signal, and a third phase information associated with the phase-shifted signal; and
    controlling the generation of the output signal based on the phase information.

19. The method of claim 18, further comprising feeding the output signal to a demodulator.

20. The method of claim 18, further comprising filtering the second signal to select a first bandwidth of the second signal for amplification.

21. The method of claim 18, wherein the step of generating the output signal comprises combining the first IF signal with the second IF signal.

22. The method of claim 18, wherein the step of generating the output signal comprises selecting the first IF signal, if the first IF signal is stronger than the second IF signal.

23. The method of claim 18, wherein the step of generating the output signal comprises selecting the second IF signal if the second IF signal is stronger than the first IF signal.

24. The method of claim 18, wherein the step of controlling the output signal comprises determining based on the phase information a power difference between the first and second IF signals.

25. The method of claim 24, wherein the step of controlling the output signal further comprises combining the first IF signal and the second IF signal, if the power difference is below a threshold value, 26. The method of claim 24, wherein the step of controlling the output signal further comprises selecting one of the first IF signal or the second IF signal, if the power difference is above a threshold value.

27. The method of claim 26, wherein the first IF signal is selected, if the first signal is greater than the second IF signal.

28. The method of claim 26, wherein the second IF signal is selected, if the second IF signal is greater than the first IF signal.

29. A signal receiving apparatus comprising:
a first signal receiving means;
a second signal receiving means;
a first signal adjusting means for amplifying a first signal received by the first receiving means;
a second signal adjusting means for amplifying and phase-shifting a second signal received by the second receiving means;
first and second signal mixing means for mixing first and second amplified and phase-shifted signals to respectively generate first and second intermediate frequency IF signals; and
a phase detecting means for determining phase difference information by processing signals generated by the first and second signal adjusting means;
a signal combining means for generating an output signal comprising of at least one of the first IF signal and the second IF signal based on the phase difference information; and
a controller means for providing a control signal to the signal combining means to control the content of the output signal based on the phase difference information, wherein the controller means receives a first phase information associated with the first signal, a second phase information associated with the second signal, and a third chase information associated with the phase-shifted signal.

30. The signal receiving apparatus of claim 29, further comprising a received signal strength indicating means for detecting power of the output signal.

31. The signal receiving apparatus of claim 29, wherein the first signal adjusting means comprises:
a duplexer for connecting a transmitter and a receiver to the first signal receiving means; and
a first amplifying means for amplifying a signal generated by the duplexer.

32. The signal receiving apparatus of claim 29, wherein the second signal adjusting means comprises:
a filtering means for selectively filtering a bandwidth of the second signal;
a second amplifying means for amplifying the filtered second signal; and
a phase shifting means for shifting a phase of the filtered second signal.

33. The signal receiving apparatus of claim 29, wherein the first and second signal receiving means are physically isolated to have a different gain.

34. The signal receiving apparatus of claim 29, wherein the first and second signal adjusting means comprise low noise amplifiers.

35. The signal receiving apparatus of claim 29, wherein the first and second intermediate frequency signals are combined to produce the output signal, if the phase difference information meets a first threshold.

36. The signal receiving apparatus of claim 29, wherein if the phase difference information meets a second threshold, then
the first IF signal is selected as the output signal, if the first IF signal is stronger than the second IF signal, and
the second IF signal is selected as the output signal, if the second IF signal is stronger than the first IF signal.

* * * * *